July 4, 1939.  T. H. GIBSON  2,164,582
BAKING ASSEMBLY
Filed April 12, 1937  2 Sheets-Sheet 1
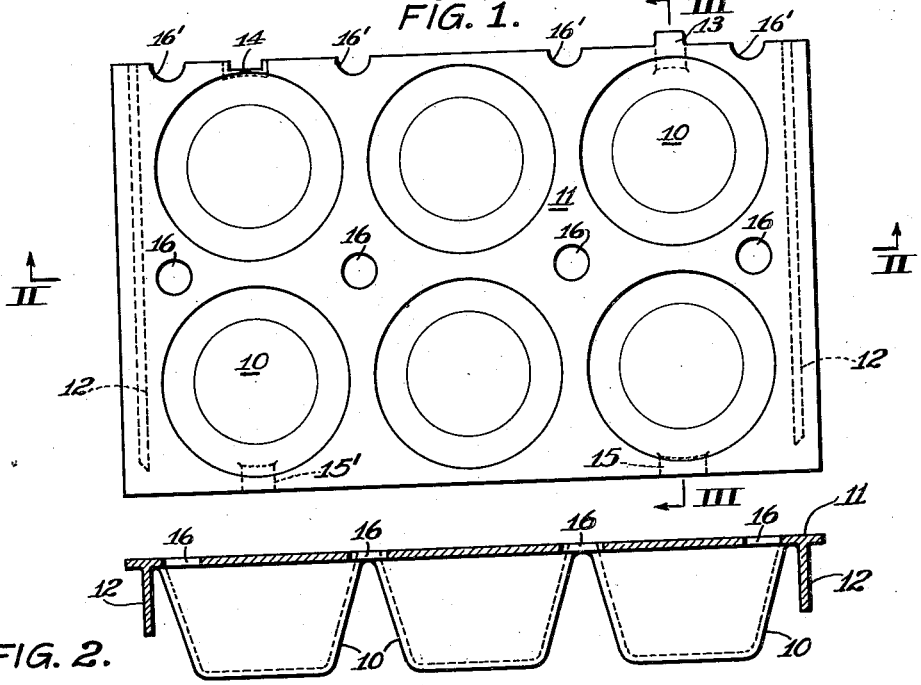
FIG. 1.
FIG. 2.
FIG. 3.
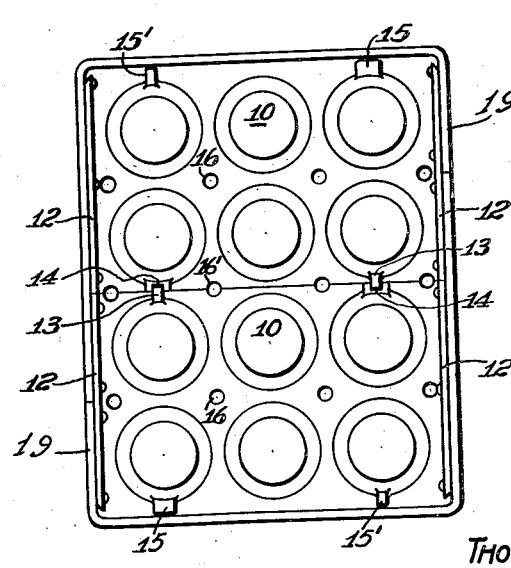
FIG. 4.
INVENTOR.
THOMAS H. GIBSON.
BY Frank J. Murphy
ATTORNEY.

July 4, 1939.  T. H. GIBSON  2,164,582
BAKING ASSEMBLY
Filed April 12, 1937  2 Sheets-Sheet 2

INVENTOR.
THOMAS H. GIBSON.
BY
ATTORNEY.

Patented July 4, 1939

2,164,582

UNITED STATES PATENT OFFICE 2,164,582

BAKING ASSEMBLY

Thomas H. Gibson, New Kensington, Pa., assignor to The Aluminum Cooking Utensil Company, New Kensington, Pa., a corporation of Pennsylvania Application April 12, 1937, Serial No. 136,249

6 Claims. (Cl. 53—6)

This invention relates to baking pans, and more particularly to baking pans adapted to be grouped into baking assemblies for use in the baking industry.

In commercial bakeries it is common practice to assemble baking pans and so to secure them that a number of pans may be handled simultaneously. In the past, the method of forming these baking assemblies large enough to serve in the baking industry consisted of securing together a number of baking pans of the common types used in the home. Assemblies of both single mold pans, such as those for baking loaves, and multiple mold pans, such as those for baking small cakes, have been made up of common sheet metal pans of these types. The problems incident to the more rigorous conditions and constant use which the industry imposes on the pan had not been solved until my invention.

Single mold baking pans heretofore have been made of sheet metal either by folding or drawing, and multiple mold pans have been made of sheet metal by drawing. The folding method results in a number of thicknesses of metal at different points on the walls of the mold. In drawing, the side walls of each mold are reduced in thickness, while the bottom of the mold and the deck are not reduced. These different thicknesses of metal in the mold walls causes differences in the heat conductivity at various portions of the mold, and this results in local overheating and uneven baking. The life of such pans in the baking industry is limited because they are easily damaged. The thickness of the sheet metal which may be used in such pans is limited by the fact that it must lend itself to the forming operations required to make the pan.

It is an object of my invention to provide a baking pan adapted to be grouped and secured with other like pans to form a baking assembly suitable for use in the baking industry. Another object is to provide a baking pan that is strong and durable under the rough use imposed on it in the baking industry. Another and further object is to provide a baking pan and baking assembly which will not be subject to local overheating and will not cause differential baking.

These and other objects are accomplished by means of the baking pan of my invention which I cast as a single casting or unit. Die casting is preferred over other casting methods because of its better adaptability to volume production and because of the greater strength and more exact dimensions attainable in the castings. By this method, baking pans whose mold walls are of uniform thickness, preventing local overheating, and of substantial thickness, providing greater durability, are produced cheaply and quickly, and the means for attaching assembly straps may be cast integrally with the pan. Generally, the single casting operation produces a complete pan, and it is never necessary to add more than a machining step. The pans so produced are durable, rugged, not subject to local overheating, and readily adapted to serve in any type of baking assembly. For the best combination of heat conductivity, lightness, durability, and casting and machining characteristics, I prefer to make the pans of my invention of aluminum.

To illustrate my invention, I have chosen certain embodiments thereof which will now be described, reference being had to the accompanying drawings, in which:

Fig. 1 is a plan view of a pan made according to one embodiment of my invention;

Fig. 2 is a cross section on the line II—II of Fig. 1;

Fig. 3 is a cross section on the line III—III of Fig. 1;

Fig. 4 is a bottom plan view of a group of pans, such as that shown in Fig. 1, secured together in a baking assembly;

Figure 5:
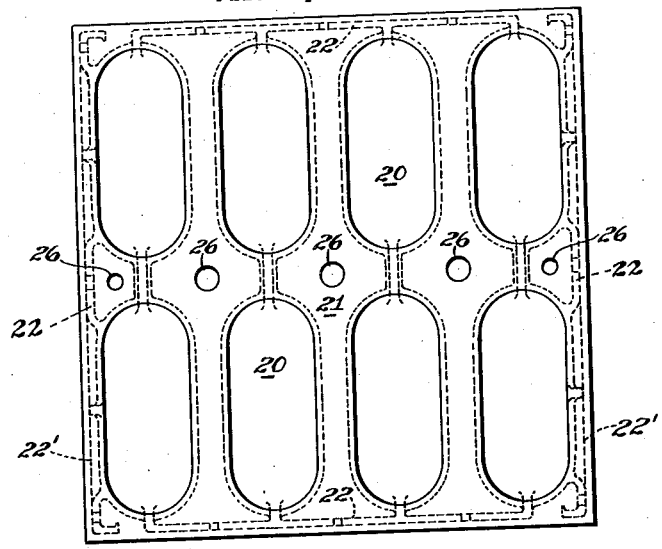
Fig. 5 is a plan view similar to Fig. 1, but showing another embodiment of my invention.

Referring now to Figs. 1 to 4, a multiple mold pan commonly called a cup-cake pan has a plurality of molds 10, here shown to be six to a pan, although it is understood that any convenient number of molds may be provided in a pan. Connecting the molds and integral therewith is a deck 11. Slightly inward from each end of the deck and integral therewith is a depending flange 12. One edge of the deck has an integral laterally projecting tongue 13 near one end, and is provided near the other end with a reinforced notch 14. In the form shown, which is to be used for the end pans of an assembly, the other edge of the deck is provided with abutments 15 and 15'. For intermediate pans, the deck is provided with the tongue and notch 13 and 14 at both edges. Centrally of the deck and spaced lengthwise thereof several openings 16 are provided, and along one edge several bays 16' are adapted to register with similar bays on an adjacent deck. The openings 16 and bays 16' allow the passage of heat and tend to equalize the temperature above and below the pan to provide even baking. They may be provided in the casting or by machining.

The form of pan shown in Figs. 1 to 3 is adapted to be joined with another like pan, by means of a strap 19, to form a two-pan baking assembly, as shown in Fig. 4. The strap 19 and flanges 12 have a plurality of suitably located registering apertures, the strap lying against the flanges and being secured thereto by bolts or rivets passing through the apertures. The flange 12, being inward of the end of the deck 11, serves as an abutment for the strap which, through this arrangement, lies under and against the deck 11.

The assembly of the two pans is made more rigid by the registry of the tongue and notch on the deck of one pan with those on the other. The abutments 15 and 15' abut against the strap at the outer edge of each pan to render the assembly more solid and stable.

The parts of the pan are substantially of a uniform thickness, so that uniform baking is accomplished through elimination of local overheating.

It will be understood that various modifications in the structure shown are possible. For instance, to provide an assembly of more than two cup-cake pans, the end pans will be made as here shown, and the intermediate pan or pans will be provided with tongue 13, notch 14, and bays 16' on opposite edges. The number of pans in an assembly is limited only by utility and convenience in handling.

The modification shown in plan in Fig. 5 is also a multiple mold pan. The molds 20, deck 21, and flange 22 are integral. A continuous deep flange is provided at opposite edges of the deck, as at 22. On the remaining edges, the flange is of varying depth, having a deep portion at 22 and a shallow portion at 22'. A pan of this type is frequently used alone, a strap being secured to the flanges 22 to prevent damage from rough handling. The strap is secured to the deep flanges 22 and abuts against the shallow portions 22' of the flange. When a number of pans of this type are assembled, the edges having the flanges of varying depth are abutted. When so arranged, the strap may be secured to the deeper continuous flange 22 of each pan, and the openings 26 extend longitudinally and centrally of the assembly.

Figure 6:
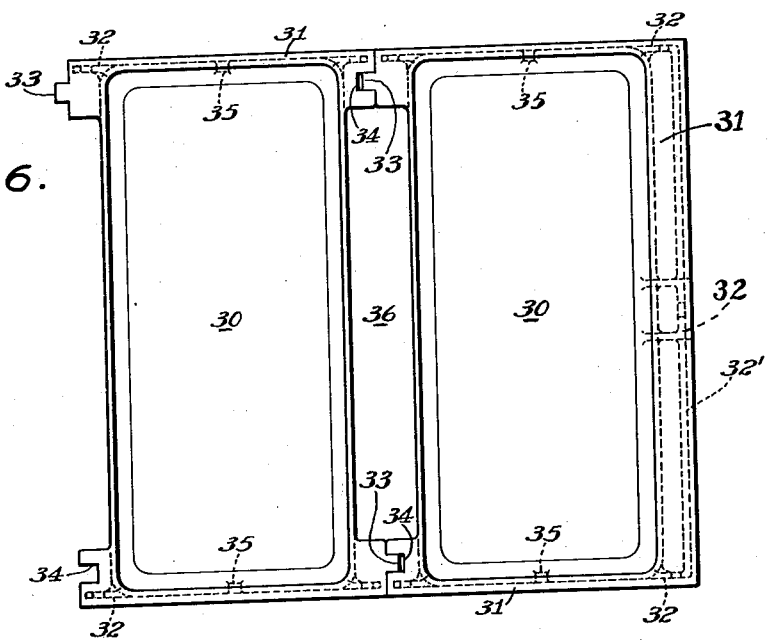
Fig. 6 is a plan view showing still another embodiment of my invention.
Figure 7:
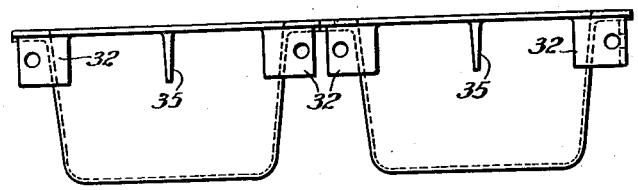
Fig. 7 is an end elevation of the assembly of pans shown in Fig. 6.

The pan shown in Figs. 6 and 7 is a bread pan of only one mold, but it will be understood that pans of the same general shape could be provided with a number of molds. Baking assemblies made up of these pans usually contain a larger number of pans than assemblies of the types shown in Figs. 1 to 5.

At the left in Fig. 6 is shown the type of bread pan used for the intermediate members of an assembly, and at the right, the type used for the end members of the assembly. As shown, the mold 30 of the intermediate pan has no large deck, but is provided at opposite ends with a small integral deck 31. This deck is relatively narrow along the ends of the mold and extends laterally a relatively great distance from the mold. Each end deck is provided with a laterally extending tongue 33 at one edge of the pan, and at the other edge of the pan with a notch 34. On the deck at the opposite end of the intermediate pan, this arrangement is reversed so that any intermediate pan may be inserted anywhere in the assembly. Each end deck is provided with integral, inset depending flanges 32, which extend laterally beyond the edge of the mold.

The end pan in an assembly of bread pans differs from the intermediate pan in having an integral deck 31 extending completely along one edge of the mold. The other edge of the end pan is arranged to correspond to the edges of the intermediate pans. Beneath the edge deck 31 of the end pan and centrally thereof is a depending relatively deep flange 32. The arrangement of flanges along the ends of the end pan is the same as that for the intermediate pans. A relatively shallow integral flange 32' extends along the outer edge of the end pan between the deep flanges 32.

In assembling a number of the pans shown in Figs. 6 and 7, the strap is secured to the deep portions 32 of the integral flanges on the intermediate and end pans. Between these points, the strap is supported by the shallow portions 32' of the flange on the end pan. Further support may be provided, if desired, by integral abutments 35 on the ends of each pan, but as the span between flanges 32 along the ends of the pans is short, these abutments may be omitted. It will be noted that the arrangement shown provides a space 36 between adjacent pans, so that the openings, such as are provided for the passage of heated air in the other forms shown, are not required.

Intermediate and end pans of the several embodiments may be made in the same die, suitable inserts, such as are commonly used in the casting art, serving to effect the variations in form between the intermediate and end pans, except as to the modification shown in Fig. 5, where intermediate pans and end pans do not vary in form. I prefer, however, to avoid the use of die inserts, and I have found that this can be done by making both intermediate and end pans in the same die, and machining the resultant casting when necessary. In this manner, pans of the form shown in Figs. 1 to 4 will be cast with one wide abutment 15 and one narrow tongue 13 on each edge of the deck. If the pan so produced is to be an intermediate pan, the wide abutments 15 on the two edges will be machined out to provide the notches or recesses 14 to receive the narrow tongues or projections 13, and the bays 16' will be machined into both edges of the deck. If the pan is to be used as an end pan, only one edge of the deck will be machined to provide notch 14 and bays 16', and on the other edge of the deck, the protruding portion of the narrow tongue 13 will be machined off.

It will be apparent that the pans of Figs. 6 and 7 may also be made in one die, and that a pan so made may be prepared for use as either an end pan or an intermediate pan by suitable machining.

While I have shown and described my invention in its relation to certain preferred embodiments thereof, it is to be understood that the invention is not limited by this description, and that it may have other embodiments and may be modified within the scope of the appended claims.

I claim:

1. A baking assembly comprising a plurality of individual cast baking units, each baking unit having a horizontal deck portion, vertical flanges extending from and beneath said deck portions, said flanges being disposed at the ends of each unit of the assembly, means positioning adjacent units in lateral alignment, a strap disposed beneath the deck portions and secured to the flanges, and auxiliary abutments for supporting said strap disposed beneath and along said deck portions at an outer edge of each end unit of the assembly, said baking units having molds of substantially uniform thickness throughout.

2. A baking assembly comprising a plurality of individual cast baking units, each baking unit having a horizontal deck portion, vertical flanges extending from and beneath said deck portions, said flanges being disposed at the ends of each unit of the assembly, means integrally incorporated in said units positioning adjacent units in lateral alignment, and a strap disposed beneath the deck portions and secured to the flanges.

3. A baking assembly comprising a plurality of individual cast baking units, each baking unit having a horizontal deck portion, vertical flanges extending from and beneath said deck portions, said flanges being disposed at the ends of each unit of the assembly, complementary recesses and projections on adjacent units for positioning said units in lateral alignment, a strap disposed beneath the deck portions and secured to the flanges, and auxiliary abutments for supporting said strap disposed beneath and along said deck portions at an outer edge of each end unit of the assembly, said baking units having molds of substantially uniform thickness throughout.

4. A baking assembly comprising a plurality of individual cast baking units, each baking unit having a horizontal deck portion, vertical flanges extending from and beneath said deck portions, said flanges being disposed at the ends of each unit of the assembly, complementary recesses and projections on adjacent units for positioning said units in lateral alignment, and a strap disposed beneath the deck portions and secured to the flanges.

5. A cast unit for a baking assembly adapted to provide uniform heating throughout all mold surfaces, comprising integral deck, mold and flange portions, and recesses and projections adapted to engage similar projections and recesses on similar units.

6. A baking assembly comprising a plurality of individual baking uits, each baking unit having a horizontal deck portion, vertical flanges extending from and beneath said deck portions, said flanges being disposed at the ends of each unit of the assembly, means integrally incorporated in said units positioning adjacent units in lateral alignment, and a strap disposed beneath the deck portions and secured to the flanges, said baking units having molds of substantially uniform thickness throughout.

THOMAS H. GIBSON.